May 2, 1967

T. L. DOKTOR 3,317,670

RECEIVER FOR DETECTING SUPERVISORY TONES
SUPERIMPOSED ON BINARY DATA SIGNALS

Filed May 28, 1963

2 Sheets-Sheet 1

INVENTOR
T. L. DOKTOR
BY R C Lipton
ATTORNEY 3,317,670

RECEIVER FOR DETECTING SUPERVISORY TONES SUPERIMPOSED ON FSK BINARY DATA SIGNALS

Theodore L. Doktor, Flushing, N.Y., assignor to Bell Telephone Laboratories, Incorporated, New York, N.Y., a corporation of New York Filed May 28, 1963, Ser. No. 283,854
8 Claims. (Cl. 178—88)

This invention relates to binary data transmission sets and, more particularly, to data set receivers arranged to discriminate between binary data signals and supervisory tone signals.

A broad object of this invention is to detect supervisory signals.

Modern data and telegraph communication systems may now provide for the transmission of data signals on voice frequency channels. The data sets are preferably arranged to communicate by frequency-shift signals comprising tones corresponding to the marking and spacing signal elements of the binary code characters. When communication is on a half duplex basis, each set sends the marking and spacing tones by way of an individual voice band and maintains the marking tone on the voice band while receiving from the other station. Such an arrangement is described in the copending application of T. L. Doktor, G. Parker, L. A. Weber and H. M. Zydney, Ser. No. 141,672, filed Sept. 29, 1961, which issued on Dec. 3, 1963 as Patent 3,113,176 and, as disclosed therein, the subscriber data sets are connected to telephone lines whereby calls to other subscriber sets are set up by way of the telephone switching network.

It is sometimes necessary to interconnect subscriber sets having different signaling rates. A speed converter is then required to accept signals at the higher signaling rate, for example, and retransmit the signals at the appropriate lower signaling rate. One such converter is disclosed in the application of N. H. Stochel, Ser. No. 283,855, concurrently filed herewith, wherein a buffer storage is provided for storing the data signals prior to retransmission at the lower signaling rate. However, continuous transmission from the higher speed set tends to fill the buffer storage. In this event, the converter is arranged to advise the transmitting set to momentarily interrupt transmission by returning a restraint signal comprising a frequency-shift tone signal superimposed on the idle marking tone normally transmitted to the sending set.

Accordingly, it is an object of this invention to discriminate between data signals and superimposed supervisory signals.

It is another object of this invention to render a data receiver unresponsive to a supervisory signal during the reception of binary data signals.

As disclosed in the above-identified application of T. L. Doktor et al., the frequency shift data signals are applied to a discriminator which converts them to direct current pulse elements recognizably by a teletypewriter. When the data set is sending, an idle marking tone is being received by the set and the discriminator output maintains a steady marking condition. If the restraint tone is received, however, the marking output condition of the discriminator is varied or fluctuating in amplitude in accordance with the restraint signal.

In accordance with an illustrative embodiment of the present invention, a restrainer circuit is provided for detecting the restraint tone superimposed on the steady marking condition. The circuit functions to amplify the received data signals and superimposed tone, detect the resultant peaks and utilize them to enable an integrating circuit which operates an indicating lamp. In the event, however, that data signals are being received, a switching circuit detects the transitions of the signal pulse elements and the resultant peaks of the detected signal transitions nullify the enabling signal applied to the integrating circuit.

The foregoing and other objects and features of this invention will be fully understood from the following description of an illustrative embodiment thereof taken in conjunction with the accompanying drawing wherein.

Figures 1, 3:
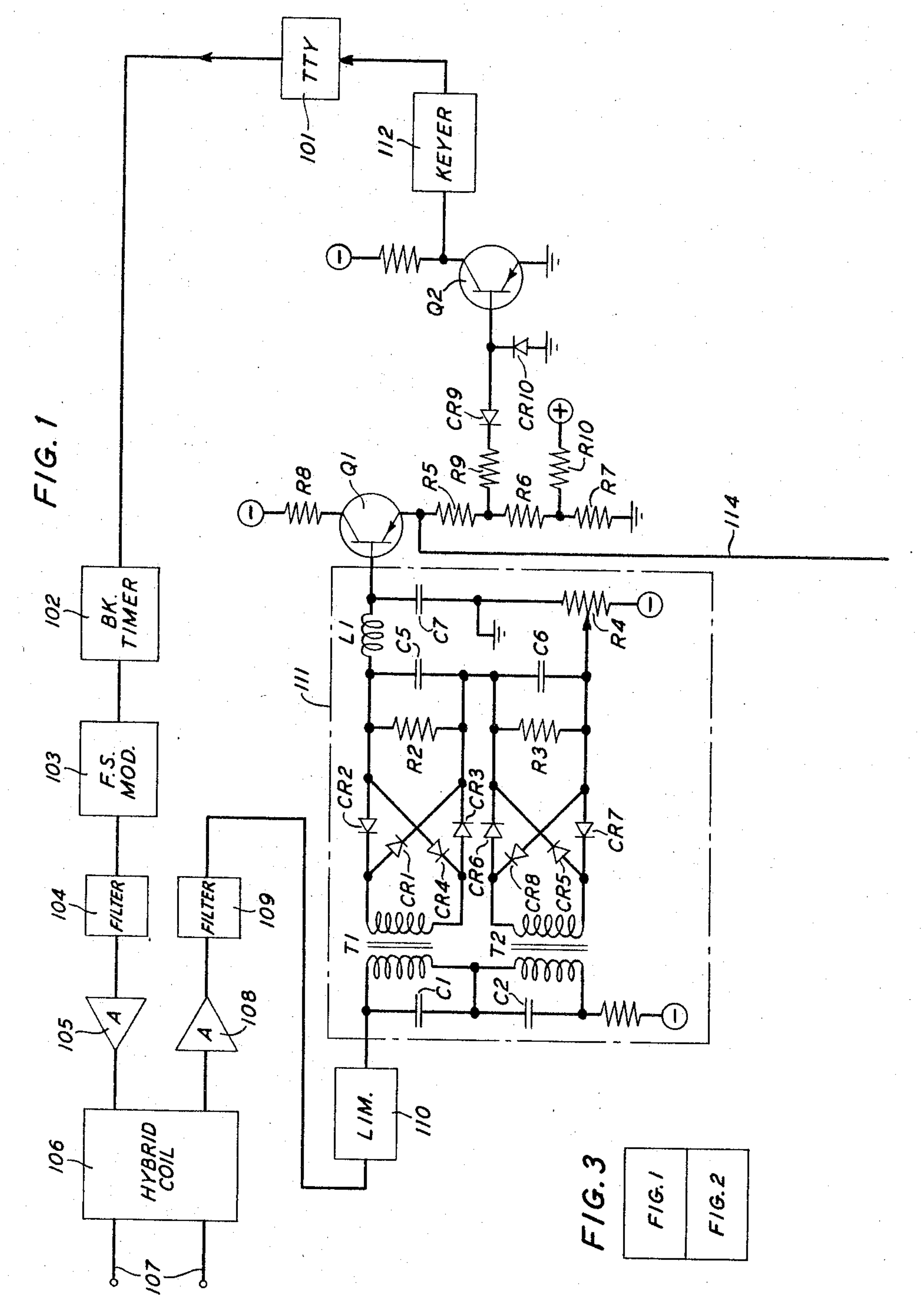
FIG. 1 shows the details of circuits and equipment which cooperate to form a subscriber data set arranged to communicate by frequency-shift signals.
FIG. 3 illustrates the arrangement of FIG. 1 and FIG. 2.

The data set shown in FIG. 1 is preferably arranged in substantially the same manner as the subscriber data set disclosed in the above-identified T. L. Doktor et al. application. Telephone line 107 which comprises a conventional line for the transmission of voice frequency signals extends to a conventional telephone switching office, not shown, and terminates in the remote switching office in the same manner as a telephone subscriber line. Included in the data set is teletypewriter 101 which comprises keyboard transmitting apparatus and printing telegraph apparatus. In addition, as disclosed in the T. L. Doktor et al. application, an attendant set, not shown, is provided including a telephone dial, a bell ringer, switch-hook contacts and a listen-only handset for originating and answering calls.

During message transmission, the teletypewriter data signals provided by the keyboard of teletypewriter 101 are repeated by break timer 102 and applied to frequency-shift modulator 103, break timer 102 functioning to limit the duration of "space" signals to preclude the generation of "break" signals. Frequency-shift modulator 103 responds to the mark and space data signals by converting the signals to frequency-shift signals within a narrow voice frequency band wherein the marking signal corresponds to the higher frequency in the band and the spacing signal corresponds to the lower frequency in the band. The frequency-shift signals are passed by filter 104 and repeated by buffer amplifier 105 to hybrid coil 106 which applies the signals across telephone line 107.

Incoming frequency-shift signals received from line 107 are applied to buffer amplifier 108 by hybrid coil 106. Filter 109 has a passband which accepts the data signals in the narrow voice frequency band and applies them to limiter 110. Limiter 110, in turn, limits the amplitude variations of the frequency-shift signals for application to the discriminator which is generally included in block 111.

As disclosed in detail in the above-identified T. L. Doktor et al. application, with the data set arranged to receive signals, two passive elements of the discriminator are placed in series with the output of limiter 110. These passive elements, as shown in FIG. 1, comprise inductor T1 and capacitor C1 in shunt thereto and inductor T2 and capacitor C2 in shunt thereto. With these two circuits active, the discriminator has the normal S-shaped curve, rendering the discriminator effective in the received voice frequency band. In addition, inductor T1, together with capacitor C1, is tuned to provide a high impedance to the lower spacing frequency and inductor T2 together with capacitor C2 is tuned to provide a high impedance in response to the higher marking frequency.

The secondary of inductor T1 is connected to the diode bridge consisting of diodes CR1 to CR4 which, in turn, is connected across load resistor R2. Similarly, the secondary of inductor T2 is connected to the diode bridge consisting of diodes CR5 to CR8 which, in turn, is connected across load resistor R3.

The tuning of the discriminator network is such that the peaks of the resonances are slightly higher and lower than the mark and space frequencies, thus producing a linear frequency-to-amplitude conversion. The amplitude output is then detected by the diode bridges and developed across load resistors R2 and R3. Capacitors C5 and C6 are smoothing capacitors to filter out the carrier ripple. Since the diode bridges are oppositely poled, a mark frequency coming into the discriminator excites the diode bridge consisting of diodes CR5 through CR8 and thus develops a positive voltage across the output load. Conversely, a spacing frequency coming into the discriminator develops a negative voltage across the output load since the diode bridge consisting of diodes CR1 through CR4 is excited. These signals are fed through the lowpass filter consisting of inductor L1 and capacitor C7 to the base of transistor amplifier stage Q1. Provision is made to adjust the position of the discriminator S curve by means of potentiometer R4.

Transistor Q1 is an emitter-follower with load resistor R5. Resistor R5, in turn, is connected to the junction of resistors R7 and R10 through resistor R6. Resistors R7 and R10, in turn, comprise a voltage divider between positive battery and ground whereby a positive potential is applied to the lower terminal of resistor R6 as viewed in FIG. 1. In addition, the collector of transistor Q1 is connected to negative battery through resistor R8.

The application of a negative spacing signal to the base of transistor Q1 increases the emitter-to-collector current. Conversely, a positive marking signal applied to the base of transistor Q1 decreases the emitter-to-collector current. With resistor R5 acting as a load resistor between the emitter of transistor Q1 and resistor R6, the potential at the junction of resistors R5 and R6 is driven negative relative to ground in response to the application of the spacing signal and positive relative to ground in response to the application of the marking signal.

The output taken from the emitter of transistor Q1 drives the base of transistor Q2 through resistor R9 and diode CR9. During the application of a negative spacing signal, diode CR10 maintains the base of transistor Q2 clamped slightly below ground, whereby the transistor is rendered conductive. When a positive marking signal is received the negative potential applied through diode CR9 to the base of transistor Q2 is removed whereby the transistor turns OFF. The consequent ON and OFF signals provided by transistor Q2 is utilized by keyer 112 to drive the printer of teletypewriter 101 in accordance with the received data signals.

When a remote station desires to advise the data set operator to momentarily interrupt transmission, restraint signals are generated by the remote station and superimposed on the normal idle marking frequency. As disclosed in the above-identified application of N. H. Stochel, the restraint signal is a frequency-shift tone signal keyed at a constant rate between the normal mark frequency and a frequency below the normal mark tone. In addition, the keying rate may be the same rate as the data signals. However, the frequency shift of the restraint tone signal is less than one-half the shift provided by the transition from the marking frequency to the spacing frequency. Accordingly, it is apparent that during the reception of the restraint signal superimposed on the marking frequency, the discriminator provides a positive signal to transistor Q1 variable in amplitude in accordance with the frequency shift of the restraint signal. Transistor Q1, in turn, maintains the potential at the junction of resistors R5 and R6 positive relative to ground thereby maintaining transistor Q2 OFF. Thus, transistor Q2, keyer 112 and teletypewriter 101 are unresponsive to the restraint signals.

Figure 2:
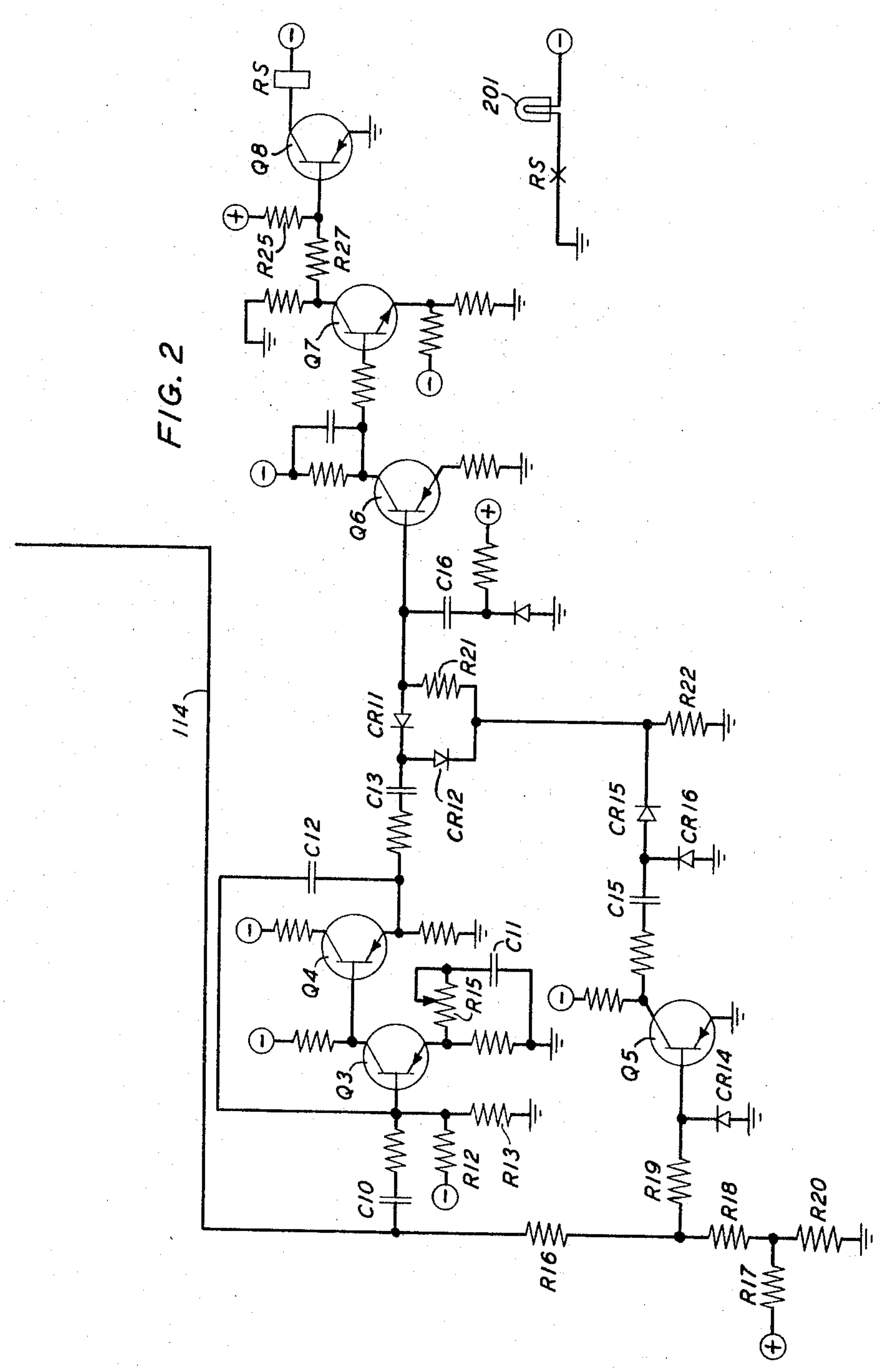
FIG. 2 shows in schematic form a restrainer circuit in accordance with this invention.

Recalling now that the data and restraint signals are obtained from the emitter of transistor Q1, these signals are also applied through lead 114 to the junction of resistor R16 and capacitor C10, FIG. 2. The signals from the emitter of transistor Q1 are then coupled through capacitor C10 to the base of transistor Q3 which operates as a linear amplifier. Bias is provided to the base of transistor Q3 from the junction of resistors R12 and R13, which resistors comprise a voltage divider between negative battery and ground. Potentiometer R15, connected in series with capacitor C11 between ground and the emitter circuit of transistor Q3, is for adjusting the gain of this stage to compensate for the initial variation of the several components in the circuit. The collector of transistor Q3 is directly coupled to buffer amplifier Q4, which is arranged as an emitter-follower stage. Capacitor C12 is coupled between the emitter of transistor Q4 and the base of transistor Q3 and provides high frequency negative feedback to improve the signal-to-noise performance of the circuit.

The emitter of transistor Q4 is coupled into a voltage doubler rectifier network consisting of capacitor C13, diodes CR11 and CR12 and resistor R21. Accordingly, the negative signal peaks of both the restraint and data signals from the emitter of transistor Q4 are passed to the upper plate of integrating capacitor C16, as viewed in FIG. 2.

Since a response is desired only from the restraint signals, the rectified output of the voltage doubler must be cancelled when data signals are being received. This is done by introducing the data and restraint signals from lead 114 to the junction of resistors R16 and R18. It is noted that since resistor R16 is connected to the emitter of transistor Q1 through lead 114, the resistor acts as a load resistor, functioning in a manner similar to load resistor R5. Resistor R16, in turn, is connected to the junction of resistors R17 and R20 through resistor R18. Resistors R17 and R20, in turn, comprise a voltage divider between positive battery and ground, whereby a positive potential is applied to the lower terminal of resistor R18, as viewed in FIG. 2.

As previously described, the application of a negative spacing signal to the base of transistor Q1 increases the emitter-to-collector current and the application of a positive marking signal to the base of transistor Q1 decreases the emitter-to-collector current. With resistor R16 acting as a load resistor between the emitter of transistor Q1 and resistor R18, the potential at the junction of resistors R16 and R18 is driven negative relative to ground in response to the application of a spacing signal, and positive relative to ground in response to the application of a marking signal.

The potential at the junction of resistors R16 and R18 drives the base of transistor Q5 through resistor R19. During the application of a negative spacing signal, diode CR14 maintains the base of transistor Q5 slightly below ground, whereby the transistor is rendered conductive. When a positive marking signal is received, the positive potential output of transistor Q1 is applied through resistor R19 driving the potential on the base of transistor Q5 positive, whereby the transistor turns OFF. Accordingly, transistor Q5 is arranged in substantially the same manner as transistor Q2 to provide ON and OFF signals in response to the spacing and marking signal inputs, respectively.

It is recalled that restaint signals may be received during a steady marking interval and that the output of transistor Q1 remains positive during the reception of the restraint signal. Accordingly, transistor Q5 is maintained nonconductive and therefore unresponsive to the restraint signal.

The output provided at the collector of transistor Q5 is rectified by a second voltage doubler network consisting of capacitor C15, diodes CR15 and CR16 and resistor R22. Thus when transistor Q5 switches ON and OFF in response to data signals, positive signal peaks are provided through diode CR15 to the junction of resistors R22 and R21. This positive signal is then applied through resistor R21 to the upper plate of integrating capacitor C16. Accordingly, the outputs of the two rectifier networks are connected in opposition to capacitor C16 which is, in turn, connected to the base of transistor Q6. However, since transistor stages Q3 and Q4 provide linear amplification, whereas transistor Q5 is driven between the OFF condition and the saturated condition, the positive signals provided by the voltage doubler network connected to the collector of transistor Q5 function to cancel the output of the linear amplifier and cause the application of a net positive charge to capacitor C16. Accordingly, during the reception of data signals a positive potential is maintained on the base of transistor Q6 maintaining the transistor OFF.

Assuming that the restraint signal is received during a steady marking interval, the amplified restraint signal provided at the emitter of transistor Q4 causes the negative signal peaks to be applied to capacitor C16, as previously described. Transistor Q5 is unresponsive to the restraint signal and therefore does not cause the application of positive signals to capacitor C16. Consequently, a net negative voltage potential is applied to the base of transistor Q6 and the transistor is turned ON, driving its collector potential in a positive direction. This positive potential is applied to the base of transistor Q7 and transistor Q7, in turn, is rendered conductive. With transistor Q7 conductive, its collector potential is driven negative and this negaitve potential is applied through resistor R27 to the base of transistor Q8. Transistor Q8, which is normally maintained nonconductive due to positive battery applied through resistor R25, is turned ON as a result of the negative potential derived from the collector of transistor Q7. With the winding of relay RS in the collector circuit of transistor Q8, the relay operates due to the emitter-to-collector current. The operation of relay RS completes an obvious energizing path for lamp 201, the energization of the lamp indicating to the teletypewriter operator that restraint signals are being received.

Although a specific embodiment of this invention has been shown and described, it will be understood that various modifications may be made without departing from the spirit of this invention and within the scope of the appended claims.

What is claimed is:

1. A detector for fluctuating supervisory signals superimposed on data signals which alternate about an amplitude level comprising, voltage detector means capacitively coupled to incoming data signals and superimposed supervisory signals and responsive to all fluctuations of the amplitude of said data signals and superimposed supervisory signals, threshold detector means responsive to each of the transitions of said data signals through said amplitude level, and means for cancelling the output of said voltage detector means in response to the output of said threshold detector means.

2. A detector for fluctuating supervisory signals superimposed on data signals which alternate about an amplitude level comprising, means capacitively coupled to incoming data signals and superimposed supervisory signals and responsive to all fluctuations of the amplitudes of said data signals and superimposed supervisory signals for providing a first voltage, means responsive to each of the transitions of said data signals through said amplitude level for providing a second voltage, means for adding said second voltage in opposition to said first voltage, and means rendered operable when said first voltage exceeds said second voltage to indicate the presence of said supervisory signals.

3. A detector for fluctuating supervisory signals superimposed on data signals which alternate about an amplitude level comprising, means capacitively coupled to incoming data signals and superimposed supervisory signals and responsive to all fluctuations of the amplitudes of said data signals and superimposed supervisory signals for providing a first voltage, threshold detector means responsive to the transitions of said data signals through said amplitude level, peak detector means responsive to the peak output amplitudes of said threshold detector means for providing a second voltage, means for adding said second voltage in opposition to said first voltage, and means rendered operable when said first voltage exceeds said second voltage to indicate the presence of said supervisory signals.

4. A detector for fluctuating supervisory signals superimposed on data signals which alternate about an amplitude level comprising, voltage integrating means, means connected to said voltage integrating means and rendered responsive by an enabling voltage, means for amplifying all the fluctuations of said data signals and superimposed supervisory signals, peak detector means responsive to each of said fluctuations of said amplified data and superimposed supervisory signals for applying an enabling voltage to said integrating means, switch means for providing an output in response to the transitions of said data signals through said amplitude level, and peak detector means responsive to the peak amplitudes of said switch means output for applying a disabling voltage to said integrating means.

5. A detector for frequency-shift tone signals superimposed on frequency shift binary data signals comprising, discrminator means for converting said frequency-shift tone and data signals to a fluctuating tone wave superimposed on binary data pulses, means rendered operable by the application of a voltage thereto, peak amplitude detecting means capacitively coupled to said discriminator means and responsive to all fluctuations of the amplitude of said tone wave superimposed on said binary data pulses for applying a voltage to said operable means, and switch means operable at the transitions of said binary data pulses for cancelling the application of said voltage to said operable means.

6. A detector for frequency-shift tone signals superimposed on frequency-shift binary data signals comprising, discriminator means for converting said frequency-shift tone and data signals to a fluctuating tone wave superimposed on binary data pulses, voltage integrating means, means connected to said voltage integrating means and rendered responsive by an enabling voltage, detecting means capacitively coupled to said discriminator means and responsive to the peak amplitudes of said binary data pulses and superimposed wave for applying an enabling voltage to said integrating means, and switch means operable at the transitions of said binary data pulses for applying a disabling voltage to said integrating means.

7. A detector for frequency-shift tone signals superimposed on frequency-shift binary data signals comprising, discriminator means for converting said frequency-shift tone and data signals to a fluctuating tone wave superimposed on binary data pulses, voltage integrating means, means connected to said voltage integrating means and rendered responsive by an enabling voltage, means for amplifying all the fluctuations of said binary data pulses and superimposed wave, amplitude detecting means responsive to all fluctuations of the output amplitudes of said amplified data pulses and superimposed wave for applying an enabling voltage to said integrating means, switch means operable at the transitions of said binary data pulses, and means responsive to the peak output amplitudes of said switch means for applying a disabling voltage to said integrating means.

8. A detector for supervisory signals which shift the frequency of frequency-shift data signals by an amount less than the frequency separation between one of the data signals and the center frequency of said frequency-shift data signals comprising, discriminator means for providing alternating signals about an amplitude level in accordance with the separation of said frequency-shift signals from said center frequency, voltage detector means capacitively coupled to said discriminator means and responsive to all the fluctuations of the amplitude of said alternating signal, threshold detector means responsive to the transitions of said alternating signal through said amplitude level, and means for cancelling the output of said voltage detector means in response to the output of said threshold detector means.

References Cited by the Examiner

UNITED STATES PATENTS

| | | | |
|---|---|---|---|
| 2,820,895 | 1/1958 | Johnstone | 328—117 |
| 3,108,224 | 10/1963 | Bradsell | 325—324 |
| 3,133,205 | 5/1964 | Zrubek | 328—177 X |

FOREIGN PATENTS

| | | |
|---|---|---|
| 931,429 | 2/1948 | France. |
| 818,349 | 8/1959 | Great Britain. |

DAVID G. REDINBAUGH, *Primary Examiner.*

J. T. STRATMAN, *Assistant Examiner.*